April 14, 1931.　　　　　J. E. BEST　　　　　1,800,771
METHOD AND APPARATUS FOR REFINING EXHAUST GAS
Original Filed July 25, 1925　　2 Sheets-Sheet 1
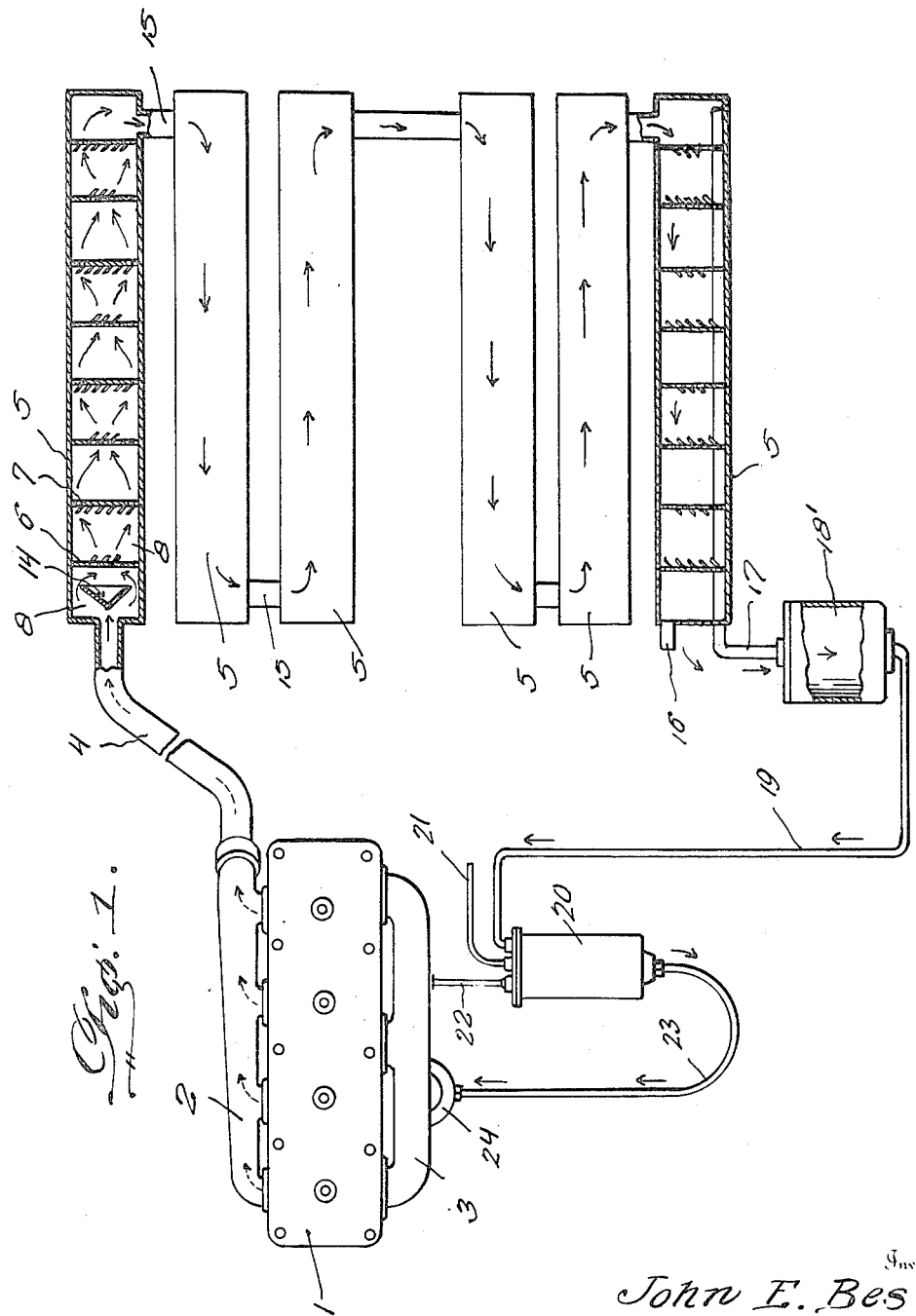
Inventor
John E. Best.
By Clarence A. O'Brien
Attorney April 14, 1931.  J. E. BEST  1,800,771
METHOD AND APPARATUS FOR REFINING EXHAUST GAS
Original Filed July 25, 1925  2 Sheets-Sheet 2
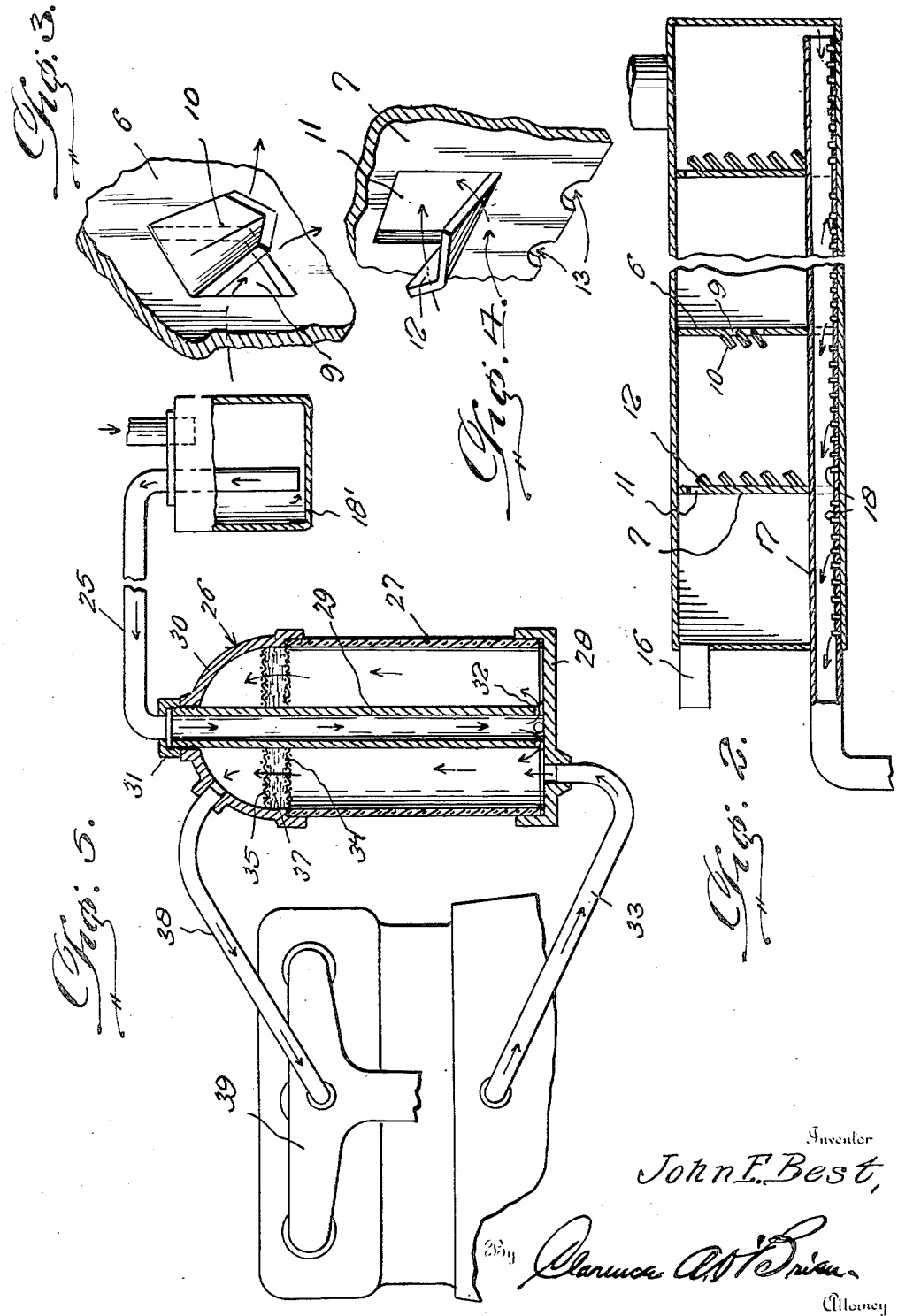
Inventor
John E. Best,
By Clarence A. O'Brian
Attorney Patented Apr. 14, 1931

1,800,771

UNITED STATES PATENT OFFICE

JOHN E. BEST, OF YOUNGSTOWN, OHIO

METHOD AND APPARATUS FOR REFINING EXHAUST GAS

Application filed July 25, 1925, Serial No. 46,123. Renewed August 30, 1930.

This invention relates to improvements in methods and apparatus for refining exhaust gas, and particularly exhaust gas from internal combustion engines in order to recover a usable portion thereof adapted for reuse in the engine.

An object of the invention resides in providing a method of treating exhaust gas consisting in subjecting it in a plurality of successively arranged chambers to a successive expansion treatment with alternate compression in order to dissipate the heat of the gas, and effect condensation of the liquefiable portions or content thereof for subsequent separation from the gaseous contents.

A further object of the invention resides in providing a method of treating exhaust gas wherein the gas is successively released in a plurality of chambers during the continuous treatment thereof for effecting the condensation of the liquefiable portion of the gas from the gaseous contents thereof without the use of special cooling medium but wherein the gas and liquid are substantially cooled, and the liquid formed for separation from the gaseous contents.

Another object of the invention resides in providing an apparatus for carrying out the method of treating the gas wherein a plurality of containers are provided which are interconnected in successive relation, and formed with a plurality of inter-communicating chambers in each container or vessel through which the exhaust gases pass for treatment in order to dissipate the heat of the gas, and cause the liquefiable portion to condense and flow into a collecting chamber forming a part of the apparatus for separation from the gaseous contents of the exhaust gas.

The invention further comprehends the provision of means for operation in conjunction with the condensing apparatus which separates the liquid contents from the gaseous content of the exhaust gas which is adapted to receive and convey the liquid contents to the internal combustion engine in condition to provide a power generating mixture therefor with a suitable fuel to be used in said engine.

The invention further comprehends other objects and improvements in the details of the construction of the apparatus which are more particularly pointed out in the following detailed description and claims directed to preferred forms of the invention, it being understood however that various changes in the size, shape, and arrangement of the parts may be made without departing from the spirit and scope of the invention as hereinafter set forth.

In the drawings forming part of this application:

Figure 1 is a diagrammatic illustration showing the arrangement of the parts for the continuous treatment of the exhaust gas from an internal combustion engine in order to separate the liquid from the gaseous contents.

Figure 2 is a vertical sectional view through the last of the series of containers.

Figure 3 is a detail perspective view of a portion of one of the partition walls showing the manner of forming the openings therethrough for treating the gas passing from one chamber to the next which effect simultaneous deflecting of the gas in all directions during release into a chamber.

Figure 4 is another enlarged detail perspective view similar to Figure 3 of partitions arranged in alternate relation with respect to the partition shown in Figure 3 showing the manner of forming the openings and the gas compressing and condensate collecting structure thereof.

Figure 5 shows the construction of a filtering chamber and its associated relation between the collecting chamber of the condensing apparatus and an internal combustion engine for conditioning the liquid content of the exhaust gas for supply to the intake manifold of the internal combustion engine for subsequent reuse in the engine.

An internal combustion engine of any suitable or desired character is illustrated diagrammatically at 1, having the exhaust pipe 2, and the intake manifold 3.

The present invention provides a pipe connection 4 with the exhaust manifold 2 of the engine for conveying the exhaust gases to the first of the plurality of substantially elongated containers 5. These elongated containers are preferably arranged in adjacent horizontal relation in the same horizontal plane, or if desired, may be arranged in any other manner which is found convenient for the purpose of mounting the same in a suitable location on an automobile. Each of these containers 5 includes a substantially elongated housing having closed ends, and in which are mounted a plurality of partition walls 6 and 7 respectively in spaced relation for providing a plurality of adjacent intercommunicating chambers 8 extending throughout the length of each of the casings. The partitions 6 are formed in a central area with a plurality of openings 9, illustrated in detail in Figure 3 which are of substantial rectangular shape, and have angularly extending lips 10 from the upper edges thereof terminating in substantially V-shaped projection to form drip members for the liquid condensed in the passage of exhaust gas from chamber to chamber, and also for breaking up the exhaust gas, and causing it to be directed in all directions throughout each chamber. The partitions 7 are constructed in a similar manner to the partition 6 and provided with a plurality of openings 11 extending around the edge portions of the partitions, and having upwardly extending projections 12 of V-shape formation from the lower edges of the openings 11. The projections 10 on the plate 6 extend rearwardly from the plate in the direction of the flow of the gas while the projections 12 on the plate 7 extend forwardly with respect to said direction of flow. In this way thorough agitation of the exhaust gas is obtained in the chamber 8 and in passing from one chamber to the next a speedy dissipation of the heat will take place without the provision of a special cooling medium together with successive condensation of the condensible portions of the gas in a successive chamber. The lower edge of each partition wall is provided with a plurality of openings 13, as illustrated in Figure 4 in order to permit the liquid to flow from one chamber 8 to the next, and throughout the several containers to a suitable collecting chamber.

The exhaust pipe 4 communicates with the first chamber of one of the containers 5 in which is mounted a substantially pyramidal baffle member 14 provided for causing agitation of the gas within the first chamber before passing through the openings 9 in the first partition 6. The opposite end of the container is provided with a connection 15 with the next container while the opposite ends of each successive container 5 is provided with a connection 15 with the next adjacent container in order that the exhaust gas will have a continuous flow throughout the entire length of each container to produce a large number of contracting and expansion treatments during the dissipation of the heat to completely condense all of the liquefiable portion of the exhaust gas. The final container 5 of the series is of similar construction with all the other containers, and with the addition of an outlet 16 for permitting the gaseous content from which the liquefiable portion has been separated to escape into the atmosphere while a pipe 17 is mounted in the bottom portion of this last container as illustrated particularly in Figure 2, to provide a conduit for conducting the liquid from said container. This pipe section has the bottom portion thereof slotted transversely as indicated at 18 throughout its entire length within the container 5, while the end portion extending beyond the container conducts the liquid therefrom to a suitable container 18' providing a collecting chamber for the liquid. This liquid condensate is then conducted through the pipe 19 by applying the suction to the intake manifold at the ends of the pipe for supplying this liquid to the vacuum tank 20 of the fuel supply system for the engine. The fuel supply pipe to the vacuum tank is indicated at 21, while the vacuum line is indicated at 22, and the feed pipe at 23 connected to the carburetor 24 attached to the intake manifold 3 of the engine. This vacuum tank and supply system may be of any of the well known constructions now used in the art, and suitable for the purpose. This liquid condensate is thus mixed with the fuel, and supplied to the engine for use after suitable atomization in the carburetor 24.

Each of the connections 15 are positioned at the bottom portion of the container in order to provide for the free flow of condensate from one container to the next so as to maintain the container substantially free of liquid contents.

Experimentation with devices for condensing the liquefiable portion of exhaust gas and the production of a device which will efficiently reduce this liquefiable portion for separation from the gaseous portion and at the same time the production of a device which may be conveniently mounted on the various types of automobiles in use have led to the conclusion hereafter stated.

It has been found from actual experiment with condensing apparatus, or other refining devices or processes known in the art, that it is substantially impossible to construct a device which will separate the liquid content of the exhaust gas from the gaseous content small enough for convenient mounting on an automobile. This is due to the fact that an ordinary cooling treatment together with expansion of the gas cannot be obtained for reducing any considerable portion of this liquid content unless the apparatus is of substantial size, making it impractical for attachment to an automobile. The same is true with devices using cooling and baffling as it has been found to require several hundred feet of passages through which the exhaust gas is continuously passed in order to reduce to liquid sufficient of the liquefiable portion to make the device sufficiently practical to warrant its operation.

From the experiments and results obtained, it has been deduced that exhaust gas from internal combustion engines contains molecular structure of varying sizes and for the purpose of illustration the sizes vary in relation to the relative size between electrons, atoms and molecules. These three forms of globular structure are of successively increasing size as well known in the art. In exhaust gas, the portion which is not liquefiable is believed to have a substantially small globular form similar to electrons, while the liquefiable portion of the gas contains globular forms of a size corresponding to atoms and molecules, the different globular sizes upon reduction to liquid form producing two different liquid combinations which are separable from one another.

It is believed that this compression on these particles of the gas cause the larger particles of the size of molecules to unite and thereby form drops on the partitions which unite to form liquid. As the gas in passing from chamber to chamber is further cooled it is believed that as the gas nears the end of treatment in the several containers, that the globules of smaller size corresponding to atoms will adhere to one another and thereby liquefy, while the remaining portion corresponding to the size of electron which makes up a large portion of the exhaust gas is not liquefiable and passes outwardly through the exhaust provided therefor into the atmosphere. In this way, two liquids are recovered, the liquid condensed from the molecular formation in practice having a dark color and forming a substantially heavy liquid, while the liquid formed from the condensation of the particles having the size corresponding to atoms forming a transparent and substantially lighter liquid.

These two liquids if allowed to stand, readily separate by gravity, but each liquid through vaporization in the carbureting device shown and when intermeshed as well as in separate form provides a highly combustible mixture well adapted as a fuel for internal combustion engines.

Referring particularly to Figure 5, the coacting chamber is indicated at 18′ which is provided with a supply pipe 25 extending from the bottom portion of the chamber to the top portion of a suitable filtering device 26, which may be used in connection with this invention for filtering and atomizing the liquid contents separated from the exhaust gas for supply to the intake manifold of the internal combustion engine. This filtering device comprises a glass cylinder 27 having a lower end member 28 receiving the same in liquid tight relation, and which is provided with a tubular extension 29 extending upwardly through the cylinder, and through an opening in the dome-shaped cover 30 for receiving the nut 31, adapted when assembled on the end of the projector 29 for securing all the parts of the filtering device in assembled relation. Openings 32 are provided in the projection 29, at the bottom portion thereof adjacent the end member 28 for permitting the liquid from the collecting chamber to flow into the bottom portion of the filtering chamber. This liquid is then evaporated or atomized by a portion of the exhaust gas sucked into the filtering device together with the oil vapor from the crank case of the internal combustion engine supplied through the pipe 33, and then filtered in passing through the pair of screens 34 and 35 respectively mounted in spaced relation in the dome 30, and between which is a suitable filtering material 37. A supply pipe 38 communicating with the dome 30 and the interior of the filtering member above the filtering material 37, and which is also attached to the intake manifold 39 provides for the creation of suction within the filtering device in order to vaporize the liquid fed thereto from the collecting chamber 18′ for supply and comingled relation with the fuel being drawn through the intake manifold to the combustion chambers of the engine.

If desired, this device may also be used in a similar manner in conjunction with the vacuum tank 20 for filtering the liquid passing into said vacuum tank.

From the foregoing description it will thus be readily appreciated that a substantially simple and efficient invention has been provided which separates the unburned and condensible portions of exhaust gas from the burnt portion thereof in liquid form without the use of special cooling means, merely by treating the gas in a plurality of successively communicating chambers for dissipating the heat of the gas together with causing a condensation of the liquefiable portion thereof.

Having thus described the invention, what I claim as new is:—

An apparatus for refining exhaust gases of engines comprising a plurality of horizontal disposed tubular casings arranged in superposed relation and interconnected with each other, the uppermost casing being connected with the exhaust manifold of an engine, each of said casings having a plurality of transversely disposed partition walls formed therein defining separate compartments in the casing, each of said partitions having sections punched outwardly from the face thereof to provide openings therein and forming lips at one edge of the openings disposed angularly with respect to the partitions, said lips having a centrally disposed deflecting end adapted to provide a predetermined path of travel of the gas and direct the same around opposite sides of the lips when passing through the openings and a liquid drain pipe extended through one end of the lowermost casing and through each of the partitions therein, said pipe having a series of slotted openings formed therein throughout its entire length within the casing and disposed at the under side of the pipe.

In testimony whereof I affix my signature.

JOHN E. BEST.